United States Patent
Park et al.

(10) Patent No.: US 8,144,316 B2
(45) Date of Patent: Mar. 27, 2012

(54) INSTRUMENT AND METHOD FOR MEASURING TOTAL LUMINOUS FLUX OF LUMINOUS ELEMENTS

(75) Inventors: Seong Chong Park, Daejeon (KR); Seung Nam Park, Daejeon (KR); Dong Hoon Lee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 302 days.

(21) Appl. No.: 12/571,506

(22) Filed: Oct. 1, 2009

(65) Prior Publication Data

US 2010/0079747 A1    Apr. 1, 2010

(30) Foreign Application Priority Data

Oct. 1, 2008   (KR) .................. 10-2008-0096406

(51) Int. Cl.
   *G01J 1/42*   (2006.01)
(52) U.S. Cl. ............... 356/236; 250/228; 356/243.1
(58) Field of Classification Search ............. 356/236, 356/243.1–243.8, 326; 250/228
   See application file for complete search history.

(56) References Cited

U.S. PATENT DOCUMENTS

| | | | | |
|---|---|---|---|---|
| 4,360,268 A | * | 11/1982 | Zucker et al. | 356/73.1 |
| 5,359,406 A | * | 10/1994 | Suzuki | 356/236 |
| 5,430,540 A | * | 7/1995 | Ohkubo | 356/236 |
| 6,157,144 A | * | 12/2000 | Galt et al. | 315/323 |
| 6,597,195 B1 | | 7/2003 | Beaudry et al. | |
| 7,508,503 B2 | * | 3/2009 | Jang | 356/236 |
| 2008/0129996 A1 | * | 6/2008 | Liu et al. | 356/326 |
| 2008/0131836 A1 | * | 6/2008 | Rueggeberg | 433/29 |
| 2009/0051910 A1 | * | 2/2009 | Imura | 356/243.8 |
| 2009/0066938 A1 | * | 3/2009 | Liu et al. | 356/226 |
| 2011/0255085 A1 | * | 10/2011 | Watanabe et al. | 356/317 |

FOREIGN PATENT DOCUMENTS

JP   2002-318156 A   10/2002

OTHER PUBLICATIONS

Miller, Cameron C. et al.: "Luminous Flux Calibration of LEDs at NIST", *Proc. 2ed CIE Expert Symposium on LED Measurement*, May 11-12, 2001, Gaithersburg, Maryland, USA (2001), 5 pages.
Ohno, Y: "Detector-based luminous-flux calibration using the Absolute Integrating-Sphere Method", *Metrologia*, 1998, 35, pp. 473-478.
Ohno, Y.: "Integrating sphere simulation: application to total flux scale realization", *Applied Optics*, May 1, 1994, vol. 33, No. 13, pp. 2637-2647.
Park, Seongchong et al.: "Calculation of Spatial Response Distribution Function of an Integrating Sphere for LED Total Luminous Flux Measurement Using a Commercial Monte-Carlo Ray-Tracing Simulator", CIE 26th Session of the CIE, Jul. 4, through Jul. 11, 2007 in Beijing, China. pp. D2-37 to D2-40.

* cited by examiner

*Primary Examiner* — Hoa Pham
(74) *Attorney, Agent, or Firm* — Frommer Lawrence + Haug LLP; Ronald R Santucci

(57) ABSTRACT

The present invention provides an instrument and method for measuring total luminous flux of luminous elements, which forms an approximately uniform spatial intensity distribution by simultaneously lighting a plurality of luminous elements for measurement in an integrating sphere when comparing a total luminous flux standard lamp with the luminous elements to measure the total luminous flux of the luminous elements, thus not requiring spatial mismatch error correction.

6 Claims, 1 Drawing Sheet

INSTRUMENT AND METHOD FOR MEASURING TOTAL LUMINOUS FLUX OF LUMINOUS ELEMENTS

CROSS-REFERENCE TO RELATED APPLICATION

This application claims the benefit of Korean Patent Application No. 10-2008-0096406, filed on Oct. 1, 2008, the entire disclosure of which is hereby incorporated by reference.

BACKGROUND OF THE INVENTION

1. Field of the Invention

The present invention relates to an instrument and method for measuring total luminous flux, which is one of the optical properties of luminous elements, and more particularly, to an instrument and method for measuring total luminous flux of luminous elements, which forms an approximately uniform spatial intensity distribution by simultaneously lighting a plurality of luminous elements for measurement in an integrating sphere when comparing a total luminous flux standard lamp with the luminous elements to measure the total luminous flux of the luminous elements, thus not requiring spatial mismatch error correction.

2. Description of Related Art

In general, a luminescent diode called a light emitting diode (LED) is a typical luminous element that converts electricity into light, in which minority carriers (electrons or holes) injected by means of a p-n junction structure of a semiconductor are produced and light is emitted by recombination of the carriers.

The performance of the LED can be evaluated with respect to energy efficiency, and the most important index for the evaluation is luminous efficacy. The luminous efficacy refers to the total luminous flux (unit: lm), which is the sum of light intensities emitted in all directions per electrical power input (unit: W), and is measured in units of lm/W.

Methods of measuring the total luminous flux that represents the optical properties of the luminous elements include an absolute measuring method using a goniophotometer and a relative measuring method using an integrating sphere and a total luminous flux standard lamp to measure the total luminous flux. Among them, an integrating sphere system applying the latter is widely used in the industrial field, since it is quick and easy to measure the total luminous flux and it is simple to ensure traceability using the standard lamp.

One of the major errors, which may occur in the total luminous flux measurement method using the integrating sphere, is spatial mismatch error, which occur due to a difference in the spatial intensity distribution (spatial intensity distribution) of light emitted from the total luminous flux standard lamp and the lamp for measurement. This error occurs because the internal structure of the integrating sphere used such as a baffle, a lamp holder, etc. and its limited reflectance of less than 100% cannot satisfy the conditions of an ideal integrating sphere with uniform spatial response, which makes it technically difficult to solve that error. Therefore, it is necessary to perform spatial mismatch correction by measuring a spatial response distribution function (SRDF) of the integrating sphere system for the total luminous flux measurement, measuring the spatial intensity distribution of the lamp for measurement, and calculating the measured results.

However, the relative measuring method using the integrating sphere requires a more complicated process to accurately perform the spatial mismatch correction than the absolute measuring method using the goniophotometer. Therefore, the integrating sphere system used in the industrial field, which is not aimed at maintaining the primary standard, generally employs the standard lamp having the same spatial intensity distribution as the lamp for measurement, thus reducing the spatial mismatch errors.

However, the spatial mismatch errors of the integrating sphere system become significant when measuring the total luminous flux of LEDs. The reason for this is that most LEDs are light sources having a certain directionality and also has different spatial intensity distributions from each other and thus it is difficult to apply a total luminous flux standard lamp suitable for each of the LEDs. Moreover, even if there is a suitable standard lamp, it requires much time and effort to match the spatial directions of the standard lamp and the lamp for measurement, thus deteriorating the efficiency of the measurement.

SUMMARY OF THE INVENTION

The present invention has been made in an effort to solve the above-described problems associated with prior art. Accordingly, the present invention provides an instrument and method for measuring total luminous flux of luminous elements, which calculates the total luminous flux of a plurality of luminous elements, from which the spatial mismatch errors are minimized, by simultaneously lighting the plurality of luminous elements, which are installed such that the light intensities of the respective luminous elements for the total luminous flux measurement are uniformly distributed spatially in an integrating sphere, to measure the sum of the total luminous fluxes and then sequentially measuring the relative intensity ratios of the respective luminous elements, which are proportional to the total luminous fluxes, in the same position.

In one aspect, the present invention provides an instrument for measuring total luminous flux of luminous elements, in which an integrating sphere, a photodetector for measuring the intensity of illumination in the integrating sphere, and a baffle for preventing the photodetector from being exposed to direct radiation from a light source are provided, the instrument including: a lamp socket in which a plurality of installation portions for mounting a plurality of luminous elements are arranged such that the intensity of light emitted from the luminous elements is uniformly distributed in the inner space of the integrating sphere; a lamp socket mounting bar installed such that the lamp socket is located in the middle of the inside of the integrating sphere; and a constant current supply means connected in series to each of the installation portions and simultaneously supplying a constant current to the luminous elements.

The lamp socket may have a polyhedral or spherical shape such that the plurality of luminous elements installed in the installation portions are oriented in different directions from each other.

The lamp socket may be coated with a white material having a reflectance of more than 90% and formed of an aluminum material.

The instrument for measuring total luminous flux of luminous elements may further include a power cut means for selectively cut off the power supply between the constant current supply means and the installation portions.

The instrument for measuring total luminous flux of luminous elements may further include a temperature control means for maintaining the electrode temperature of the luminous elements constant.

In another aspect, the present invention provides a method for measuring total luminous flux of luminous elements, which measures the total luminous flux of the luminous elements by comparing a total luminous flux standard light source with the luminous elements in an integrating sphere, the method including: (a) detecting an electric signal based on the intensity of illumination in the integrating sphere after installing a standard light source in the middle of the inside the integrating sphere and lighting the standard light source, and calculating a calibration coefficient by calibrating the detected electric signal in units of total luminous flux; (b) detecting an electric signal based on the intensity of illumination in the integrating sphere after mounting a lamp socket in the same position as the standard light source, installing a plurality of luminous elements to be oriented in different direction from each other, and simultaneously lighting the plurality of luminous elements; (c) calibrating the detected electric signal of the luminous elements in units of total luminous flux using the calibration coefficient; (d) measuring relative light intensity ratios which are proportional to the total luminous fluxes of the luminous elements by sequentially installing and lighting the respective luminous elements in the same position of the inside of the integrating sphere; and (e) calculating the total luminous flux of the respective luminous elements using the sum of the total luminous fluxes of the luminous elements measured in step (c) and the relative light intensity ratios of the respective luminous elements measured in step (d).

In step (b), the total luminous fluxes of the luminous elements may be corrected by measuring the absorbency of the integrating sphere before installing the luminous elements in the lamp socket.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, exemplary embodiments of the present invention will be described in detail with reference to the accompanying drawings. Terms used in the present invention are used to illustrate the exemplary embodiments, but not intended to limit the present invention. A singular representation may include a plural representation as far as it represents a definitely different meaning from the context. The present invention may include several embodiments, and a repeated description of the same components as those of the prior art will be omitted.

The present invention provides an instrument and method for measuring total luminous flux, which forms an approximately uniform spatial intensity distribution of a plurality of luminous elements by simultaneously lighting the luminous elements installed in different directions such that the luminous fluxes spatially overlap each other, thus spatially averaging the difference in the spatial intensity distribution (spatial distribution of emitted light) between a standard lamp and the luminous elements. As a result, it is possible to minimize spatial mismatch errors and thus not require spatial mismatch error correction.

Figure 1:
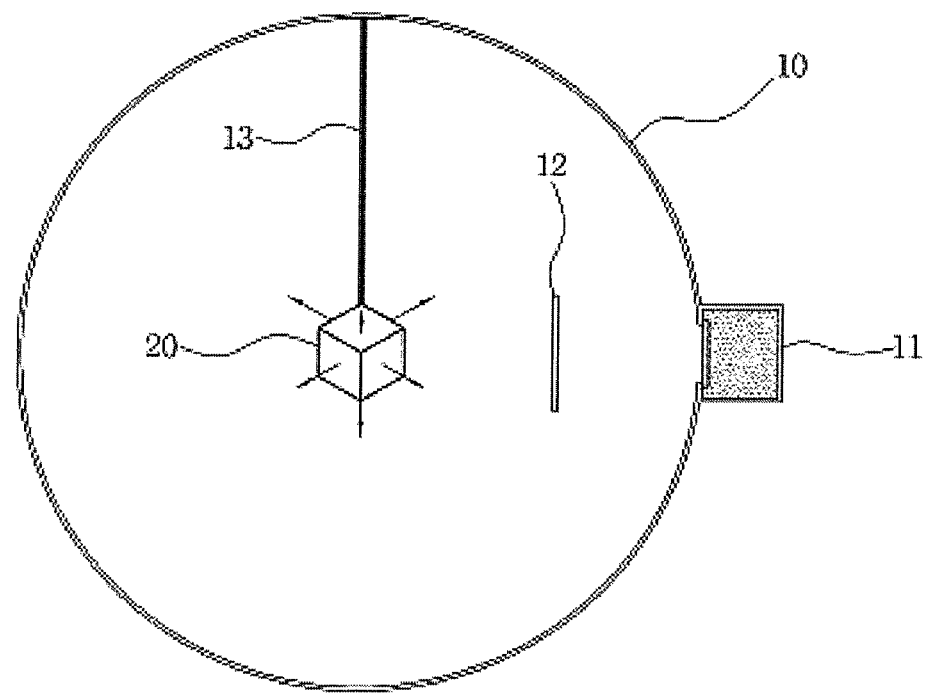
FIG. 1 is a schematic diagram of an instrument for measuring total luminous flux of luminous elements in accordance with an exemplary embodiment of the present invention.
Figure 2:
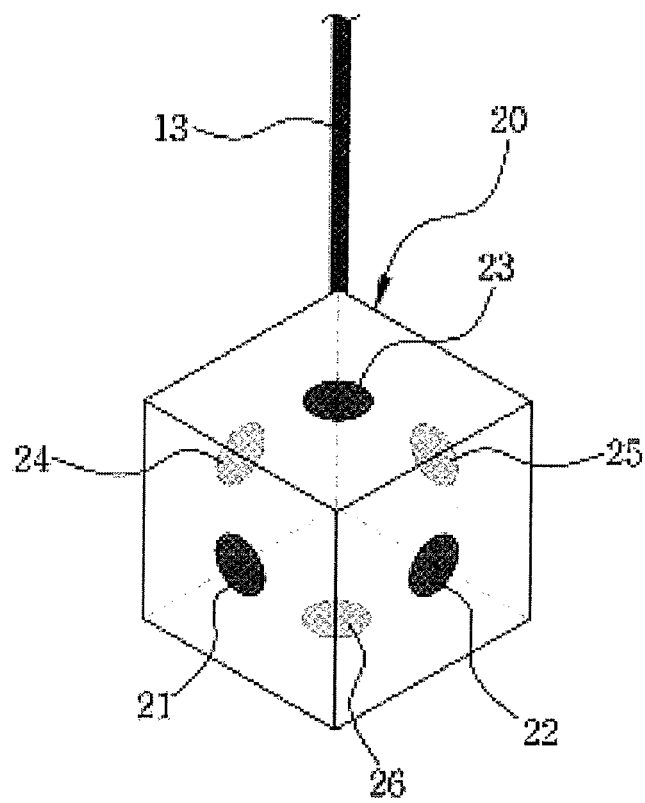
FIG. 2 is an enlarged view showing main parts of FIG. 1.

FIG. 1 is a schematic diagram of an instrument for measuring total luminous flux of luminous elements in accordance with an exemplary embodiment of the present invention, and FIG. 2 is an enlarged view showing main parts of FIG. 1.

The instrument for measuring total luminous flux of luminous elements in accordance with the present invention is configured by installing a lamp socket 20 for mounting a plurality of luminous elements for measurement in a total luminous flux measurement system including an integrating sphere 10, a baffle 12, and a photodetector 11.

That is, as shown in FIG. 1, the instrument for measuring total luminous flux of luminous elements in accordance with the present invention includes the photodetector 11 detecting an optical signal based on the intensity of illumination to convert the detected optical signal into an electric signal and mounted in the integrating sphere 10 and a lamp socket mounting bar 13 for mounting the lamp socket 20, in which the luminous elements are installed, in the middle of the inside of the integrating sphere 10. Moreover, the baffle 12 is disposed between the photodetector 11 and the lamp socket 20 such that the photodetector 11 may not receive direct radiation from the luminous elements.

In an exemplary embodiment of the present invention, the lamp socket 20 has a cubic shape such that the luminous elements are oriented in different directions from each other, and each of the luminous elements is mounted in each of central installation portions 21 to 26 on each side of the lamp socket 20 to uniformly illuminate the inside of the integrating sphere 10, thus making the spatial intensity distribution uniform. Moreover, a constant current supply means (not shown) for supplying a constant current to the luminous elements is connected in series to each of the installation portions 21 to 26, in which each of the luminous elements is installed, such that the respective luminous elements can be simultaneously lighted by the constant current supply means.

The lamp socket 20 may be formed of an aluminum material having a low thickness and a high conductivity to rapidly dissipate heat generated due to light emitted from the luminous elements, thus ensuring accurate total luminous flux measurement. Otherwise, a temperature control means for maintaining the electrode temperature of the luminous elements constant is further provided to make the total luminous flux measurement more accurate.

Moreover, in order to more accurately measure the total luminous flux of the luminous elements, a white material having a reflectance of more than 90% in the visible wavelength range is coated on the surface of the lamp socket 20 such that the light emitted from the luminous elements is reflected to the integrating sphere 10 without any significant loss.

A standard light source (standard lamp) which will be compared with the luminous elements is installed on the lamp socket mounting bar 13 using a separate socket having the same conditions (e.g., material and surface treatment) as the lamp socket 20 for installing the luminous elements. An electric signal of the photodetector 11 is output to calculate a calibration coefficient which is used to calibrate in units of total luminous flux, and the calibration coefficient can be applied to the present invention regardless of the type or characteristics of the standard light source which is generally used in the total luminous flux measurement system.

The lamp socket 20 may have any shape such as a polyhedral or spherical shape as long as the luminous elements can uniformly illuminate the inner space of the integral sphere 10 and can be simultaneously lighted, other than the cubic shape shown in FIGS. 1 and 2.

However, since an average total luminous flux of the plurality of luminous elements installed in the lamp socket 20 and simultaneously lighted is calculated by measuring the sum of the total luminous fluxes of the plurality of luminous elements and then sequentially measuring the relative luminous flux ratios of the luminous elements, it is necessary to use the luminous elements of the same type having the same spatial and spectral intensity distribution, thus making the total luminous flux measurement more accurate.

Meanwhile, it is preferable that a power cut means be provided between the installation portions 21 to 26 of the lamp socket 20 and the constant current supply means to selectively cut off the power supply to the installation portions (e.g., 22 to 26) except for the installation portion (e.g., 21) in which the luminous element for measurement is installed, thus measuring the relative luminous flux ratio of each luminous element.

The integrating sphere 10 applied to the present invention has an appropriate size according to the size and type of the luminous elements and is capable of being opened to mount and demount the luminous elements and the standard light source.

Next, the process of measuring the total luminous flux of the luminous elements using the instrument for measuring the total luminous flux of the luminous elements in accordance with the present invention will be described.

First, the standard lamp as the standard light source is mounted in the inside of the integrating sphere 10 and the constant current supply means is operated to light the standard lamp. An electric signal of the photodetector 11 that has detected the optical signal based on the intensity of illumination in the integrating sphere 10 is output to be calibrated in units of total luminous flux, and a calibration coefficient is calculated based on the same.

Upon completion of the total luminous flux measurement, the standard light source is pulled out of the integrating sphere 10, and the cubic lamp socket 20 in which the luminous elements for measurement will be mounted is installed in the same position as the standard light source. Then, before the luminous elements are installed, the absorbency of the integrating sphere 10 is measured to correct the total luminous fluxes of the luminous elements by evaluating the characteristics of the integrating sphere 10 of which internal parts and structure are changed by the installation of the lamp socket 20.

Subsequently, the luminous elements are installed in the lamp socket 20 and simultaneously lighted such that the luminous fluxes partially overlap each other in the inner space of the integrating sphere 10, thus forming a uniform spatial intensity distribution. An electric signal detected by the photodetector 11 is multiplied by the calibration coefficient calculated through the standard light source to obtain a total luminous flux value.

At this time, the total luminous flux value $F_{total}$ obtained by multiplying the electric signal by the calibration coefficient corresponds to the sum of the total luminous flux values $F_1$, $F_2$, $F_3$, $F_4$, $F_5$, and $F_6$ of six luminous elements mounted in the cubic lamp socket 20 as represented by the following Equation 1, and the total luminous flux of each luminous element is calculated by measuring the relative luminous flux ratio of each luminous element.

$$F_{total} = F_1 + F_2 + F_3 + F_4 + F_5 + F_6. \quad \text{[Equation 1]}$$

For this purpose, the relative intensity ratios which are proportional to the total luminous fluxes of the respective luminous elements are calculated using electric signal values $y_1$, $y_2$, $y_3$, $y_4$, $y_5$ and $y_6$ of the photodetector 11 obtained by cutting off the power supply to the installation portions (e.g., 22 to 26) except for the installation portion (e.g., 21) and sequentially installing and lighting the six luminous elements in the selected installation portion (e.g., 21), and the relative intensity ratios of the luminous elements can be represented by the following Equation 2.

$$y_1 : y_2 : y_3 : y_4 : y_5 : y_6 = F_1 : F_2 : F_3 : F_4 : F_5 : F_6. \quad \text{[Equation 2]}$$

As such, the output values measured by the photodetector 11 are proportional to the total luminous fluxes of the respective luminous elements and correspond to the relative light intensity ratios between the six luminous elements. Therefore, it is possible to calculate the total luminous flux of each luminous element based the sum of the total luminous fluxes (refer to Equation 1) of the six luminous elements measured in the above manner and the relative intensity ratios of the respective luminous elements (refer Equation 2). That is, the total luminous flux $F_i$ of the $i^{th}$ luminous element (I=1, 2, 3, 4, 5, and 6) can be calculated using the following Equation 3.

$$F_i = F_{total} \times y_1 / (y_1 + y_2 + y_3 + y_4 + y_5 + y_6) \quad \text{[Equation 3]}$$

As such, the present invention calculates the total luminous flux value of each luminous element, from which the spatial mismatch errors are minimized, by simultaneously lighting the plurality of luminous elements installed in the integrating sphere to measure the sum of the total luminous fluxes and measuring the relative intensity ratios of the respective luminous elements which are proportional to the total luminous fluxes.

Moreover, when the present invention is applied to products such as a lighting device using a plurality of luminous elements, the plurality of luminous elements correspond to a single measurement object, and thus the total luminous flux of the plurality of luminous elements can be measured at a time. That is, the sum of the total luminous fluxes of the luminous elements can be measured after installing the plurality of luminous elements to be oriented in different directions from each other in the integrating sphere and simultaneously lighting the luminous elements. Accordingly, since the sum of the total luminous fluxes of the luminous elements corresponds to an average total luminous flux value of the measurement objects, it is possible to simply measure the total luminous flux of the measurement objects without the necessity of measuring the relative intensity ratios of the respective luminous elements.

As described above, according to the instrument and method for measuring total luminous flux of luminous elements of the present invention, it is possible to spatially average the difference in the spatial intensity distribution between the standard lamp and the luminous elements for measurement regardless of the structure and properties of the integrating sphere, thus forming an approximately uniform spatial intensity distribution of the plurality of luminous elements. Therefore, it is possible to obtain an accurate total luminous flux of any luminous elements by minimizing the spatial mismatch errors without the necessity of performing the spatial mismatch correction.

Moreover, when the total luminous flux is measured for the plurality of luminous elements as a single measurement object, the process of measuring the relative intensity ratios of the respective luminous elements can be eliminated, thus reducing the time required to measure the total luminous flux.

As above, exemplary embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. An instrument for measuring total luminous flux of luminous elements, in which an integrating sphere, a photodetector for measuring the intensity of illumination in the integrating sphere, and a baffle for preventing the photodetector from being exposed to direct radiation from a light source are provided, the instrument comprising:
   a lamp socket in which a plurality of installation portions for mounting a plurality of luminous elements are arranged such that the intensity of light emitted from the luminous elements is uniformly distributed in the inner space of the integrating sphere, wherein the lamp socket has a polyhedral or spherical shape such that the plurality of luminous elements installed in the installation portions are oriented in different directions from each other;
   a lamp socket mounting bar installed such that the lamp socket is located in the middle of the inside of the integrating sphere; and
   a constant current supply means connected in series to each of the installation portions and simultaneously supplying a constant current to the luminous elements.

2. The instrument for measuring total luminous flux of luminous elements of claim 1, wherein the lamp socket is coated with a white material having a reflectance of more than 90% and is formed of an aluminum material.

3. The instrument for measuring total luminous flux of luminous elements of claim 1, further comprising a power cut means for selectively cut off the power supply between the constant current supply means and the installation portions.

4. The instrument for measuring total luminous flux of luminous elements of claim 1, further comprising a temperature control means for maintaining the electrode temperature of the luminous elements constant.

5. A method for measuring total luminous flux of luminous elements, which measures the total luminous flux of the luminous elements by comparing a total luminous flux standard light source with the luminous elements in an integrating sphere, the method comprising:
   (a) detecting an electric signal based on the intensity of illumination in the integrating sphere after installing a standard light source in the middle of the inside the integrating sphere and lighting the standard light source, and calculating a calibration coefficient by calibrating the detected electric signal in units of total luminous flux;
   (b) detecting an electric signal based on the intensity of illumination in the integrating sphere after mounting a lamp socket in the same position as the standard light source, installing a plurality of luminous elements to be oriented in different direction from each other, and simultaneously lighting the plurality of luminous elements;
   (c) calibrating the detected electric signal of the luminous elements in units of total luminous flux using the calibration coefficient;
   (d) measuring relative light intensity ratios which are proportional to the total luminous fluxes of the luminous elements by sequentially installing and lighting the respective luminous elements in the same position of the inside of the integrating sphere; and
   (e) calculating the total luminous flux of the respective luminous elements using the sum of the total luminous fluxes of the luminous elements measured in step (c) and the relative light intensity ratios of the respective luminous elements measured in step (d).

6. The method for measuring total luminous flux of luminous elements of claim 5, wherein in step (b), the total luminous fluxes of the luminous elements are corrected by measuring the absorbency of the integrating sphere before installing the luminous elements in the lamp socket.

* * * * *